(12) United States Patent
Karaoguz et al.

(10) Patent No.: US 9,060,311 B2
(45) Date of Patent: Jun. 16, 2015

(54) ENTERPRISE LEVEL MANAGEMENT IN A MULTI-FEMTOCELL NETWORK

(75) Inventors: Jeyhan Karaoguz, Irvine, CA (US); Nambirajan Seshadri, Irvine, CA (US); Nicholas Ilyadis, Merimack, NH (US)

(73) Assignee: Broadcom Corporation, Irvine, CA (US)

( * ) Notice: Subject to any disclaimer, the term of this patent is extended or adjusted under 35 U.S.C. 154(b) by 270 days.

(21) Appl. No.: 12/540,857

(22) Filed: Aug. 13, 2009

(65) Prior Publication Data

US 2011/0019639 A1 Jan. 27, 2011

Related U.S. Application Data

(60) Provisional application No. 61/228,303, filed on Jul. 24, 2009.

(51) Int. Cl.
*H04W 36/00* (2009.01)
*H04W 84/04* (2009.01)
(Continued)

(52) U.S. Cl.
CPC ........ *H04W 36/0055* (2013.01); *H04W 36/005* (2013.01); *H04W 36/0083* (2013.01); *H04W 84/045* (2013.01); *H04W 88/06* (2013.01); *H04W 88/10* (2013.01)

(58) Field of Classification Search
CPC ........... H04W 8/00; H04W 8/08; H04W 8/22; H04W 36/00; H04W 36/0005; H04W 36/0011; H04W 36/0016; H04W 36/0061; H04W 36/0066; H04W 36/0083; H04W 40/00; H04W 40/08; H04W 40/12; H04W 52/04

USPC .............. 370/310, 331, 310.2, 338, 315, 328, 370/329, 332, 333, 252, 311
See application file for complete search history.

(56) References Cited

U.S. PATENT DOCUMENTS 6,728,540 B1 * 4/2004 DeSantis et al. .............. 455/437
7,120,431 B1 10/2006 Huo et al.
(Continued)

FOREIGN PATENT DOCUMENTS

CN 101193351 A 6/2008
CN 101427604 A 5/2009
WO WO2007/126267 11/2007

OTHER PUBLICATIONS

European Patent Office, Communication with European Search Report, in Application No. 10007247.9, dated Nov. 5, 2010.
(Continued)

*Primary Examiner* — Anh Ngoc Nguyen
(74) *Attorney, Agent, or Firm* — Sterne, Kessler, Goldstein & Fox P.L.L.C.

(57) ABSTRACT

Aspects of a method and system for enterprise level management in a multi-femtocell network are provided. In this regard, one or more endpoint devices may receive traffic management information from a hybrid network controller for enabling handoff of calls and/or communication sessions among femtocells and/or access points. The received traffic management information may comprise set-up instructions, handoff instructions, transmit power, neighbor list information, signal quality thresholds, frequency assignments, transmission time, code assignments and/or antenna pattern assignments. The endpoint device may control handoffs between a communication device external to the communication system and the femtocells, access points and/or endpoint devices.

20 Claims, 7 Drawing Sheets

(51) Int. Cl.
  *H04W 88/06* (2009.01)
  *H04W 88/10* (2009.01)

(56) References Cited

U.S. PATENT DOCUMENTS

| | | | |
|---|---|---|---|
| 7,245,938 B2 | 7/2007 | Sobczak et al. | |
| 7,463,901 B2 | 12/2008 | Svedberg et al. | |
| 7,948,936 B2* | 5/2011 | Lohr et al. | 370/329 |
| 7,969,929 B2 | 6/2011 | Schladetzky et al. | |
| 8,072,914 B2* | 12/2011 | Brisebois et al. | 370/311 |
| 8,073,446 B2 | 12/2011 | Ishii et al. | |
| 8,111,655 B2 | 2/2012 | Hui | |
| 8,150,397 B2 | 4/2012 | Khetawat et al. | |
| 8,175,607 B2 | 5/2012 | Engstrom et al. | |
| 8,213,937 B2 | 7/2012 | Erceg et al. | |
| 8,504,044 B2 | 8/2013 | Erceg et al. | |
| 8,730,835 B2 | 5/2014 | Karaoguz et al. | |
| 8,761,752 B2 | 6/2014 | Erceg et al. | |
| 2002/0002706 A1 | 1/2002 | Sprunk | |
| 2002/0071396 A1 | 6/2002 | Lee et al. | |
| 2002/0196840 A1 | 12/2002 | Anderson et al. | |
| 2003/0100291 A1 | 5/2003 | Krishnarajah et al. | |
| 2004/0022210 A1 | 2/2004 | Frank et al. | |
| 2004/0038647 A1 | 2/2004 | Mahany | |
| 2004/0042421 A1 | 3/2004 | Mahany | |
| 2004/0125775 A1 | 7/2004 | Rios | |
| 2004/0224694 A1 | 11/2004 | Zhao et al. | |
| 2005/0201343 A1 | 9/2005 | Sivalingham et al. | |
| 2005/0282521 A1 | 12/2005 | Hermann et al. | |
| 2006/0013176 A1 | 1/2006 | De Vos et al. | |
| 2006/0023648 A1 | 2/2006 | Amos | |
| 2006/0023661 A1 | 2/2006 | Bennett | |
| 2006/0025141 A1 | 2/2006 | Marsh et al. | |
| 2006/0045069 A1 | 3/2006 | Zehavi et al. | |
| 2006/0089142 A1 | 4/2006 | Vuorinen et al. | |
| 2006/0194538 A1 | 8/2006 | Palin et al. | |
| 2006/0209821 A1 | 9/2006 | Jung et al. | |
| 2006/0240828 A1 | 10/2006 | Jain et al. | |
| 2007/0070928 A1* | 3/2007 | Sutivong et al. | 370/310 |
| 2007/0097939 A1 | 5/2007 | Nylander et al. | |
| 2007/0099567 A1 | 5/2007 | Chen et al. | |
| 2007/0183427 A1 | 8/2007 | Nylander et al. | |
| 2007/0218927 A1 | 9/2007 | Kuo | |
| 2007/0270152 A1 | 11/2007 | Nylander et al. | |
| 2007/0299571 A1 | 12/2007 | Laberteaux et al. | |
| 2008/0057956 A1 | 3/2008 | Black et al. | |
| 2008/0058003 A1 | 3/2008 | Rydnell et al. | |
| 2008/0076386 A1 | 3/2008 | Khetawat et al. | |
| 2008/0130596 A1 | 6/2008 | Kalhan | |
| 2008/0130597 A1 | 6/2008 | Kalhan | |
| 2008/0132239 A1 | 6/2008 | Khetawat et al. | |
| 2008/0207170 A1 | 8/2008 | Khetawat et al. | |
| 2008/0244148 A1 | 10/2008 | Nix, Jr. et al. | |
| 2008/0293382 A1 | 11/2008 | Lubenski et al. | |
| 2008/0293433 A1 | 11/2008 | Wallis | |
| 2008/0299960 A1 | 12/2008 | Lockhart et al. | |
| 2009/0042536 A1 | 2/2009 | Bernard et al. | |
| 2009/0046665 A1 | 2/2009 | Robson et al. | |
| 2009/0052350 A1 | 2/2009 | Chen et al. | |
| 2009/0061877 A1 | 3/2009 | Gallagher et al. | |
| 2009/0063740 A1 | 3/2009 | Yeh et al. | |
| 2009/0092122 A1 | 4/2009 | Czaja et al. | |
| 2009/0093246 A1 | 4/2009 | Czaja et al. | |
| 2009/0097448 A1 | 4/2009 | Vasudevan et al. | |
| 2009/0103479 A1* | 4/2009 | Goto et al. | 370/328 |
| 2009/0129263 A1 | 5/2009 | Osborn | |
| 2009/0137228 A1 | 5/2009 | Horn et al. | |
| 2009/0156213 A1 | 6/2009 | Spinelli et al. | |
| 2009/0170520 A1* | 7/2009 | Jones | 455/439 |
| 2009/0219888 A1* | 9/2009 | Chen et al. | 370/331 |
| 2009/0221295 A1 | 9/2009 | Sahin et al. | |
| 2009/0225683 A1 | 9/2009 | Collins et al. | |
| 2009/0233595 A1 | 9/2009 | Harris et al. | |
| 2009/0253421 A1 | 10/2009 | Camp, Jr. et al. | |
| 2009/0257361 A1 | 10/2009 | Deshpande et al. | |
| 2009/0258644 A1 | 10/2009 | Osborn | |
| 2009/0274104 A1 | 11/2009 | Addy | |
| 2009/0280820 A1 | 11/2009 | Nakahara | |
| 2009/0286510 A1 | 11/2009 | Huber et al. | |
| 2009/0286544 A1 | 11/2009 | Huber et al. | |
| 2009/0316649 A1 | 12/2009 | Chen | |
| 2009/0316652 A1* | 12/2009 | Agashe et al. | 370/331 |
| 2010/0016022 A1 | 1/2010 | Liu et al. | |
| 2010/0027694 A1 | 2/2010 | Touboul et al. | |
| 2010/0041364 A1 | 2/2010 | Lott et al. | |
| 2010/0054196 A1 | 3/2010 | Hui | |
| 2010/0056132 A1 | 3/2010 | Gallagher | |
| 2010/0113006 A1 | 5/2010 | Pajjuri et al. | |
| 2010/0118842 A1 | 5/2010 | Kalhan | |
| 2010/0118844 A1 | 5/2010 | Jiao et al. | |
| 2010/0167728 A1 | 7/2010 | Venkitaraman et al. | |
| 2010/0189084 A1 | 7/2010 | Chen et al. | |
| 2010/0189090 A1 | 7/2010 | Mahany | |
| 2010/0214939 A1 | 8/2010 | Ryan | |
| 2010/0214977 A1 | 8/2010 | Hegde | |
| 2010/0246482 A1 | 9/2010 | Erceg et al. | |
| 2010/0246483 A1 | 9/2010 | Erceg et al. | |
| 2010/0254357 A1 | 10/2010 | Abraham et al. | |
| 2010/0296401 A1 | 11/2010 | Karaoguz et al. | |
| 2010/0296487 A1 | 11/2010 | Karaoguz et al. | |
| 2010/0296497 A1 | 11/2010 | Karaoguz et al. | |
| 2010/0296498 A1 | 11/2010 | Karaoguz et al. | |
| 2010/0296499 A1 | 11/2010 | Karaoguz et al. | |
| 2011/0009074 A1 | 1/2011 | Hsu et al. | |
| 2011/0165878 A1 | 7/2011 | Nylander et al. | |
| 2011/0235615 A1 | 9/2011 | Kalhan | |
| 2012/0122424 A1 | 5/2012 | Herscovici et al. | |
| 2012/0238280 A1 | 9/2012 | Erceg et al. | |
| 2012/0322450 A1 | 12/2012 | Karaoguz et al. | |

OTHER PUBLICATIONS

Huaiyu Liu et al., "Energy Efficient Network Selection and Seamless Handovers in Mixed Networks", World of Wireless, Mobile and Multimedia Network & Workshops, 2009. WOWMOM 2009. IEEE International Symposium ON A, IEEE, Piscataway, NJ, USA, Jun. 15, 2009, pp. 1-9, XP031543635, ISBN: 978-1-4244-4440-3.

Alcatel-Lucent: "Policy Based Terminal Triggered, ANDSF Decided Access Selection" 3GPP Draft; S2-081658_Revision of 1355_ANDSF Discussion V2, 3rd Generation Partnership Project (3GPP), Mobile Competence Centre; 650, Route Des Lucioles; F-06921 Sophia-Antipolis Cedex; France, vol. SA WG2, No. Athens; Feb. 16, 2008, XP050263998 [retrieved on Feb. 16, 2008].

Final Office Action mailed Mar. 1, 2012 issued in U.S. Appl. No. 12/470,826.

Non-final Office Action mailed Sep. 1, 2011 in U.S. Appl. No. 12/470,826.

English-Language Abstract for Chinese Patent Publication No. 101193351 A, published Jun. 4, 2008; 2 pages.

English-Language Abstract for Chinese Patent Publication No. 101427604 A, published May 6, 2009; 2 pages.

Office Action directed to related Chinese Patent Application No. 201010178795.7, mailed Nov. 5, 2012; 11 pages.

Office Action directed to related Taiwanese Patent Application No. 099116252, mailed Apr. 21, 2014; 7 pages.

Communication from the Examining Division of the European Patent Office directed to related European Patent Application No. 10 007 247.9, mailed Feb. 14, 2012; 11 pages.

Office Action directed to related Chinese Patent Application No. 201010233853.1, mailed Nov. 28, 2012; 6 pages.

* cited by examiner

ENTERPRISE LEVEL MANAGEMENT IN A MULTI-FEMTOCELL NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 61/228,303 filed on Jul. 24, 2009.

This patent application makes reference to:
U.S. patent application Ser. No. 12/470,764 filed on May 22, 2009;
U.S. patent application Ser. No. 12/470,772 filed on May 22, 2009;
U.S. patent application Ser. No. 12/470,826 filed on May 22, 2009;
U.S. patent application Ser. No. 12/470,997 filed on May 22, 2009; and
U.S. patent application Ser. No. 12/470,983 filed on May 22, 2009.

Each of the above stated applications is hereby incorporated herein by reference in its entirety.

FIELD OF THE INVENTION

Certain embodiments of the invention relate to communications. More specifically, certain embodiments of the invention relate to a method and system for enterprise level management in a multi-femtocell network.

BACKGROUND OF THE INVENTION

A femtocell may be placed in a customer's residence or in a small business environment, for example. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

An important characteristic of femtocells is their ability to control access. In an open access scenario, any terminal and/or subscriber may be allowed to communicate with the femtocell. Accordingly, the femtocell usage may somewhat resemble that of a macrocell system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a low power in a controlled environment. It may be likely that they may not require a license from a local authority, as macrocell base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocell networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

An access point is a device that may be placed in a customer's residence or in a small business environment and provide WLAN, WiFi, LTE and/or WiMax service. For example, access points may be attached to an Enterprise network to allow users to access a corporate intranet. An access point may be enabled to connect an endpoint device such as a computer or handheld wireless device to an intranet or an internet service provider (ISP) via a physical broadband connection which may be a digital subscriber line (DSL) connection and/or a cable connection for example. Access points may communicate over-the-air based on one or more communication standards comprising 802.11 and/or 802.16.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enterprise level management in a multi-femtocell network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for enterprise level management in a multi-femtocell network. A communication system may comprise a hybrid network controller, one or more femtocells, one or more access points and/or one or more end-point devices. The femtocells and/or access points may comprise 2G, 3G and/or 4G technology. For example, the access points may comprise WLAN access points, LTE access points and/or WiMax access points. One or more endpoint devices may receive traffic management information from a hybrid network controller for enabling handoff of calls and/or communication sessions among femtocells, access points and/or end-point devices. The received traffic management information may comprise set-up instructions, handoff instructions, transmit power, neighbor list information, signal quality thresholds, frequency assignments, transmission time, code assignments and/or antenna pattern assignments. The endpoint device may control handoffs between a communication device external to the communication system and the femtocells, access points and/or end-point devices. Received signal strength, interference levels, SNR, signal path delay, power consumption, traffic loads, bandwidth usage and/or radio resource availability may be monitored and/or analyzed by the endpoint devices. The endpoint devices may assign time slots, codes, antenna patterns as well as a serving femtocell and/or AP for a set up and/or a handoff. The traffic management information may be received via one or more wireless connections.

Figure 1A:
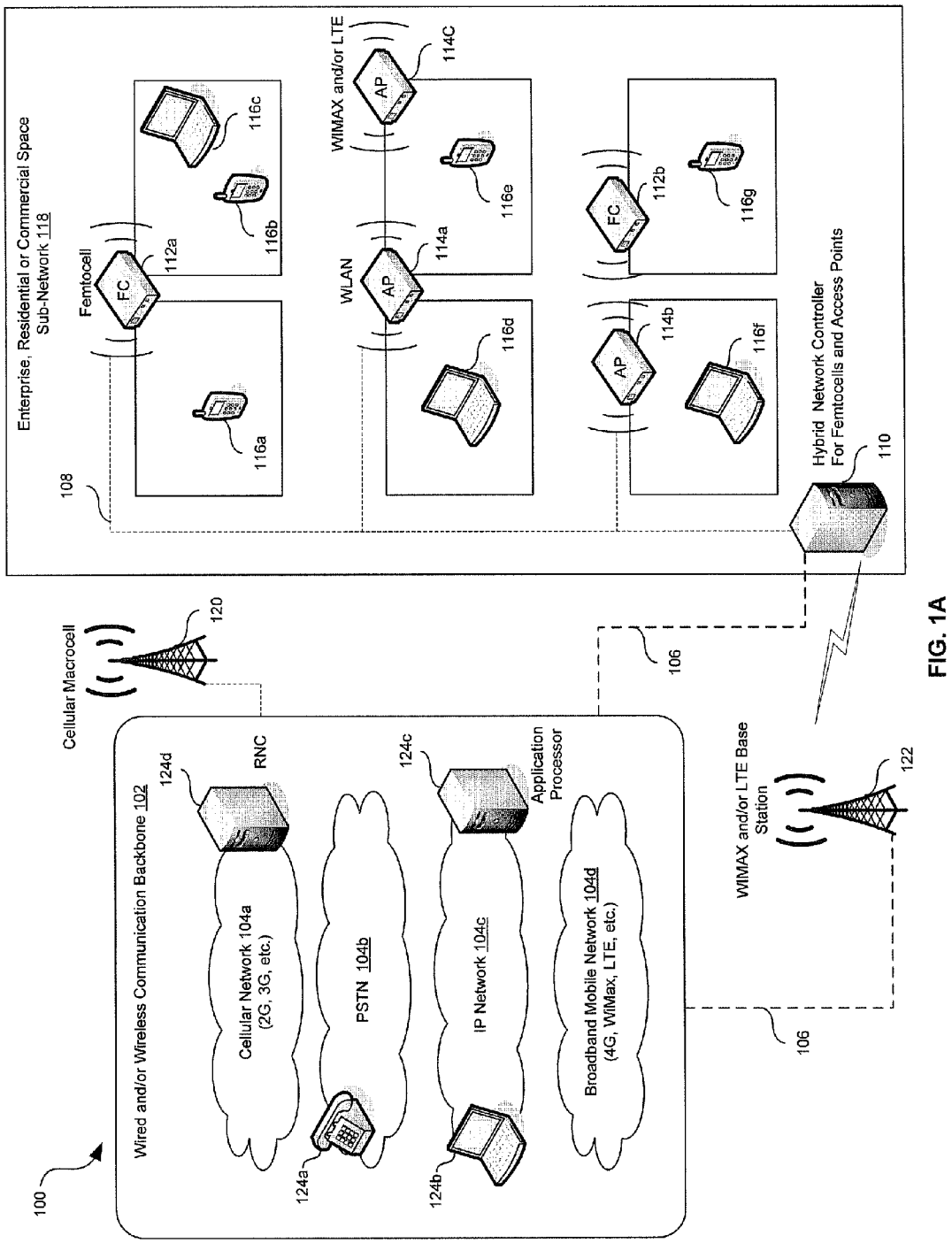
FIG. 1A is a diagram illustrating an exemplary hybrid network comprising a hybrid network controller, femtocells, access points and/or user equipment, in accordance with an embodiment of the invention.

FIG. 1A is a diagram illustrating an exemplary hybrid network comprising a hybrid network controller, femtocells, access points and endpoint devices, in accordance with an embodiment of the invention. Referring to FIG. 1A, there is shown a system of networks 100 comprising the wired and/or wireless communication backbone 102 which comprises a cellular network 104a, a public switched telephone network 104b, a IP network 104c, a broadband mobile network 104d, the WIMAX and/or LTE base station 122, the telephone 124a, the laptop 124b, the application server 124c, an radio network controller (RNC) 124d, a cellular macrocell 120 and a hybrid sub-network 118. The hybrid sub-network 118 comprises a hybrid network controller 110, a plurality of femtocells 112a and 112b that are collectively referred to herein as femtocells 112, a plurality of access points (AP) 114a, 114b and 114c that are collectively referred to herein as APs 114, and a plurality of endpoint devices or user equipment (UE) 116a, . . . , 116g that are collectively referred to herein as UEs 116 and/or endpoint devices 116. In addition, the hybrid sub-network 118 comprises a wired and/or wireless connection 108 and an Ethernet, WiMax and/or LTE broadband link 106.

The hybrid sub-network 118 may comprise a hybrid network controller 110, user equipment (UE) 116a, . . . , 116g, femtocells 112a and 112b and/or access points (AP) 114a and 114b that may be installed in an enterprise system, commercial properties, residential properties and/or multi-tenant properties for example. The enterprise system may be deployed in office buildings, schools, hospitals or government buildings for example. The commercial properties may comprise, for example, stores, restaurants and/or offices. The residential properties may comprise, for example, single-family homes, home offices, and/or town-houses. Multi-tenant properties may comprise residential and/or commercial tenants such as apartments, condos, hotels, and/or high rises. In various embodiments of the invention, the hybrid sub-network 118 may be controlled by the hybrid network controller 110. In addition, all or a portion of the hybrid sub-network 118 may be managed by a service provider which licenses cellular frequencies utilized by the hybrid network controller 110 and/or femtocells 112.

The hybrid network controller 110 comprises suitable logic, circuitry, interfaces and/or code that may be operable to control and/or manage communication among the UEs 116, the femtocells 112 and/or the APs 114. In this regard, the hybrid network controller 110 may be operable to control resources within the sub-network 118. For example, the hybrid network controller 110 may be operable to assign the femtocells 112 and/or the APs 114 to handle calls and or sessions for the UEs 116. Moreover, the hybrid network controller 110 may be operable to manage handoffs between and/or among the femtocells 112 and APs 114. In this regard, a UE 116 may establish a call and/or communication session with one or more femtocells 112 and/or APs 114 and may add or switch to another femtocell 112 and/or AP 114 while maintaining the same call and/or communication session. The UE 116 may be operable to allocate radio resources and/or communicate handoff control parameters to the femtocells 112, the APs 114 and/or the UEs 116 based on the received traffic management information from the hybrid network controller 110. Exemplary handoff control parameters may comprise neighbor information, bandwidth, traffic usage and/or signal quality thresholds. Neighbor information may indicate a frequency, time slot and/or PN code offset of neighboring femtocells 112 and/or APs 114 that may be candidates for a handoff. A handoff may be initiated based on bandwidth requirements and/or traffic loading, for example. Furthermore, signal quality thresholds may trigger a handoff in instances when a threshold is exceeded. Signal quality thresholds may comprise signal strength, bit error rate, $E_b/N_0$ and/or signal to noise ratio (SNR), for example.

The UEs 116, femtocells 112 and/or APs 114 may provide status and/or information regarding operating conditions to the hybrid network controller 110. The hybrid network controller 110 may utilize the information to determine traffic management information for operation of the UEs 116, femtocells 112, and/or APs 114, for example, handoff. For example, the hybrid network controller 110 may be operable to determine when a UE 116 should handoff to another femtocell and/or AP and/or may determine which femtocell 112 and/or AP 114 may handle the handoff. Exemplary information may comprise round trip path delay, received signal strength information, traffic distribution data, load balance data, UE battery level, measured interference (SNR, SINR, CINR), bit error rates, bandwidth availability, frequency, code and/or time slot utilization, antenna configurations, software configuration and/or maximum transmit power. In various embodiments of the invention, global navigation satellite system (GNSS) timing and/or location coordinates for one or more of the femtocells 112, the APs 114 and/or the UEs 116 may be sent to the hybrid network controller 110. The timing information may enable the network controller to coordinate handoffs between and/or among the femotcells 112, the APs 114 and/or the UEs 116 and/or to schedule transmission and/or reception of data for example.

The hybrid network controller 110 may be communicatively coupled to the femtocells 112 and/or the APs 114 via a wired and/or wireless connection 108. In this regard, the connection 108 may support Ethernet, WLAN and/or cellular connectivity. In addition, the hybrid network controller 110 may be communicatively coupled to the wired and/or wireless communication backbone 102 via the Ethernet, WiMax and/or LTE broadband link 106. For example, the hybrid network controller 110 may communicate with one or more of the networks 104 via the Ethernet, WiMax and/or LTE broadband link 106, for example.

The femtocells 112 may each comprise suitable logic, circuitry, interfaces and/or code that may be operable to communicate wirelessly with the UEs 116 utilizing one or more cellular standards comprising IS-95, CDMA, GSM, TDMA, GPRS, EDGE, UMTS/WCDMA, TD-SCDMA, HSDPA, extensions thereto, and/or variants thereof. Data comprises any analog and/or digital information including but not limited to voice, Internet data, and/or multimedia content. Multimedia content may comprise audio and/or visual content comprising, video, still images, animated images, and/or textual content. The femtocells 112 may each communicate with various devices such as the UEs 116. Exemplary cellular standards supported by the femtocells 112 may be specified in the International Mobile Telecommunications-2000 (IMT-2000) standard and/or developed by the 3rd generation partnership project (3GPP), the 3rd generation partnership project 2 (3GPP2) and/or fourth generation specifications.

The femtocells 112 may each comprise suitable logic, circuitry, interfaces and/or code that may be operable to communicate utilizing IP protocol over a wired or wireless connection 108 with the hybrid network controller 110. In various embodiments of the invention, the femtocells 112 may comprise suitable logic, circuitry and/or code that are operable to receive and/or process control information from the hybrid network controller 110. In this regard, the control information may comprise various parameter settings, resource allocation and/or configuration information for enabling handoffs between two or more of the femtocells 112 and/or the APs 114. In addition, the femtocells 112 may be operable to provide information to the hybrid network controller 110 that may be utilized to manage the handoffs.

The APs 114 may comprise suitable logic, circuitry, interfaces and/or code that may be operable to provide WLAN, WiFi, LTE and/or WiMax connectivity to one or more of the UEs 116 based on one or more 802.11 and/or 802.16 standards, for example. In this regard, the APs 114 may provide Internet connectivity, multimedia downloads and/or IP telephony sessions to the UEs 116. The APs 114 may be managed by the hybrid network controller 110 via the wired and/or wireless connection 108. A plurality of APs 114 may be operable to support simultaneous sessions and/or handoffs of a single UE 116. In addition, one or more APs 114 may be operable to support simultaneous sessions and/or handoffs for a single UE 116 with one or more femtocells 112. In various embodiments of the invention, the APs 114 may be operable to support handoff or simultaneous sessions of a single UE 116 with an AP in another sub-network (not shown). In various embodiments of the invention, the APs 114 may comprise suitable logic, circuitry and/or code that may be operable to receive and/or process control information from the hybrid network controller 110. In this regard, the control information may comprise various parameter settings, resource allocation and/or configuration information for enabling handoffs among and/or between two or more the APs 114 and/or femtocells 112. In addition, the APs 114 may be operable to provide information to the hybrid network controller 110 that may be utilized to manage the handoffs.

The user equipment (UE) 116 may each comprise suitable logic, circuitry, interfaces and/or code that may be operable to communicate utilizing one or more wireless standards. For example, the UEs 116 may be operable to communicate with the APs 114 based on 802.11 standards and/or variants thereof. In addition, the UEs 116 may be operable to communicate with the femtocells 112 based on one or more wireless standards such as IS-95, CDMA, EVDO, GSM, TDMA, GPRS, EDGE, UMTS/WCDMA, TD-SCDMA, HSDPA, WIMAX and/or LTE. The UEs 116 may be operable to communicate based on Bluetooth, Zigbee and/or other suitable wireless technologies. The UEs 116 may each be operable to transmit and/or receive data to and/or from the femtocells 112 and/or APs 114 in the hybrid sub-network 118 as well as with other cellular base stations and/or APs. Exemplary UEs 116 may comprise laptop computers, mobile phones, media players, HD television systems, video and/or still cameras, game consoles and/or location determination enabled devices. The UEs 116 may be enabled to receive, process, and/or present multimedia content and may additionally be enabled to run a web browser or other applications for providing Internet services to a user of the UE 116.

The UEs 116 may comprise suitable logic, circuitry and/or code that may be operable to receive and/or process control and/or traffic management information from the hybrid network controller 110. In this regard, the control and/or traffic management information may comprise various parameter settings, resource allocation and/or configuration information for enabling setup and/or handoffs between the femtocells 112 and/or the APs 114. In addition, the UEs 116 may be operable to provide information to the hybrid network controller 110 that may be utilized to manage the handoffs. In various embodiments of the invention, the UEs 116 may be multimode devices that may be operable to communicate simultaneously with a plurality of femtocells 112 and/or APs 114. For example, the UE 116b may be enabled to communicate simultaneously with the femtocell 112a and the AP 114a. Alternatively, the UE 116 devices may be enabled to communicate simultaneously with a plurality of femtocells 112 and/or simultaneously with a plurality of APs 114. Moreover, the UE 116 devices may be operable to perform handoffs, for example, between multiple femtocells 112, between femtocells 112 and APs 114 and/or between multiple APs 114.

The wired and/or wireless communication backbone 102 may comprise suitable logic, circuitry and/or code that may be operable to provide access to a plurality of networks, for example, the cellular network 104a, the public switched telephone network (PSTN) 104b, the IP network 104c and/or the broadband mobile network 104d. The cellular network 104a may comprise 2G and/or 3G networks, for example. The broadband mobile network 104d may comprise 4G networks, for example, WiMax and/or LTE networks. The wired and/or wireless communication backbone 102 and/or the networks 104 may comprise various endpoint and/or user equipment devices. For example, the telephone 124a may be communicatively coupled to the PSTN 104b. In addition, the laptop 124b and/or the application server 124c may be communicatively coupled to the IP network 104c. In this regard, the telephone 124a, the laptop 124b and/or the application server 124c may be accessible to devices within the sub-network 118 via the wired and/or wireless communication backbone 102. For example, a UE 116c may receive a phone call from a remote landline telephone 124a that is located within the PSTN network 104b.

In addition, the wired and/or wireless backbone 102 may be communicatively coupled to other sub-networks and/or private intranets (not shown) for example. In this manner, the wired and/or wireless communication backbone 102 may enable the UEs 116 to communicate with remote resources such as other user equipment, an application server on the Internet and other network devices that may be communicatively coupled via the networks 104 for example. The wired and/or wireless backbone 102 may be communicatively coupled to the hybrid network controller 110 via the Ethernet, WiMax and/or LTE broadband link 106. Although the Ethernet, WiMax and/or LTE broadband link 106 is shown in FIG. 1, the invention is not so limited. For example, the broadband link 106 may comprise other types of links such as ATM or frame relay, for example.

In operation, the hybrid network controller 110, femtocells 112, APs 114 and/or UEs 116 may be operable to support various types of handoffs comprising for example, soft handoff, hard handoffs, handoffs among and/or between different technologies and/or handoffs to and/or from entities outside of the sub-network 118. The hybrid network controller 110 and/or UE 116 may determine which of the femtocells 112 and/or the APs 114 may handle a handoff for a UE 116 based on signal quality, bandwidth constraints and/or resource availability, for example. In addition, the hybrid network controller 110 and/or UE 116 may assign femtocells and/or APs to a call and/or communication session.

During a soft handoff, a plurality of femtocells 112 and/or APs 114 may handle the same call and/or data session simultaneously with a UE 116. For example, during soft handoff, two or more femtocells 112 and/or APs 114 may transmit and/or receive bit streams comprising the same content to and/or from a UE 116. On the receive side of the two or more of the femtocells 112 and/or the APs 114, the received bit streams comprising the same content may be delivered to the hybrid network controller 110. The UE 116 may dynamically select the best quality bits from the two bit streams and may deliver the best quality bits to a target entity. In the UE 116, received signals comprising the bit streams that comprise the same content may be combined prior to demodulation, for example, combined over the air or in a rake receiver. The received signals may also be demodulated and the UE 116 may select the best quality bits from the multiple streams.

The hybrid network controller 110 may manage hard handoffs for the UE 116. In this regard, an UE 116 may establish a call and/or session with another device via a first femtocell 112 and/or AP 114 and then may maintain the call and/or session while switching to a different femtocell 112 and/or AP 114. In various embodiments of the invention, the hybrid network controller 110 may be operable to manage handoffs between one or more femtocells 112 and one or more APs 114 wherein a UE 116 is operable to handoff from one technology to another during a call and/or communication session. For example, the UE 116 may be engaged in a data session via the femtocell 112 that may utilize 3GPP wireless technology. The hybrid network controller 110 may send a message to the UE 116 via the femtocell 112 indicating that it may handoff to the AP 114. The AP 114 may support 802.11 wireless technology. In this regard, the UE 116 may switch from utilizing a 3GPP interface to an 802.11 interface during the call in order to handoff from a femtocell to an AP.

The hybrid network controller 110 may limit handoffs from femtocells 112 and/or APs within the sub-network 118 and other femtocells, APs and/or base stations that may be located within range of the UEs 116. For example, the cellular macrocell base station 120 may provide a signal that is adequate to handle calls and/or communication sessions with the UEs 116 within the sub-network 118, however, the hybrid network controller 110 may not allow the UEs 116 to handoff to the cellular macrocell base station if the femtocells 112 and/or APs are operable to handle a call. In instances when the femtocells 112 and/or APs 114 are not able to handle a call, for example, when a UE 116 is engaged in a call and may be leaving the service area of the sub-network 118, the hybrid network controller may enable a handoff to an external entity. In this regard, the hybrid network controller 110 may manage handoffs between one or more femtocells 112 and/or APs 114 and an entity outside of the sub-network 118. For example, in an instance where the UE 116a is engaged in a call and is moved away from the location of the sub-network 118, the hybrid network controller 110 may communicate with the RNC 124d via the Ethernet, WiMax and/or LTE broadband link 106, the wired and/or wireless communication backbone 102 and/or the cellular network 104a to enable a handoff for the UE 116a. The handoff may occur between the femtocell 112a and the cellular macrocell base station 120. The hybrid network controller 110 may also receive control information from a service provider network to support handoff management.

In various embodiments of the invention, a UE 116 may have established a call and/or communication session with another UE device and/or with a network resource within the wired and/or wireless communication backbone 102. For example, the UE 116c may be engaged in an IP telephone call with the laptop 124b via the femtocell 112a, for example. The UE 116c may have traveled away from the serving area of the femtocell 112a. The hybrid network controller 110 may utilize status and/or operating condition information received from one or more femtocells 112, APs 114 and/or the UEs 116 to determine which femtocell 112 and/or AP 114 may qualify to receive a handoff of the UE 116a from the femtocell 112a to serve the existing call and/or session. The determination may be based on one or more of signal quality measurements and/or availability of radio resources, for example. The UE 116 may receive traffic management information from the hybrid network controller 110. The UE 116 may be operable to select one or more of the femtocells 112 and/or APs 114 to handle the handoff and may allocate resources and/or communicate control parameters for the selected femtocells 112 and/or APs 114. In this manner, the UE 116 may manage the call and/or communication session between the one or more femtocells 112 and/or the APs 114 and the UE 116. The UE 116 may also exchange information with a service provider, for example, via the RNC 124d, and may manage the handoff based on control information received from the service provider.

Figure 1B:
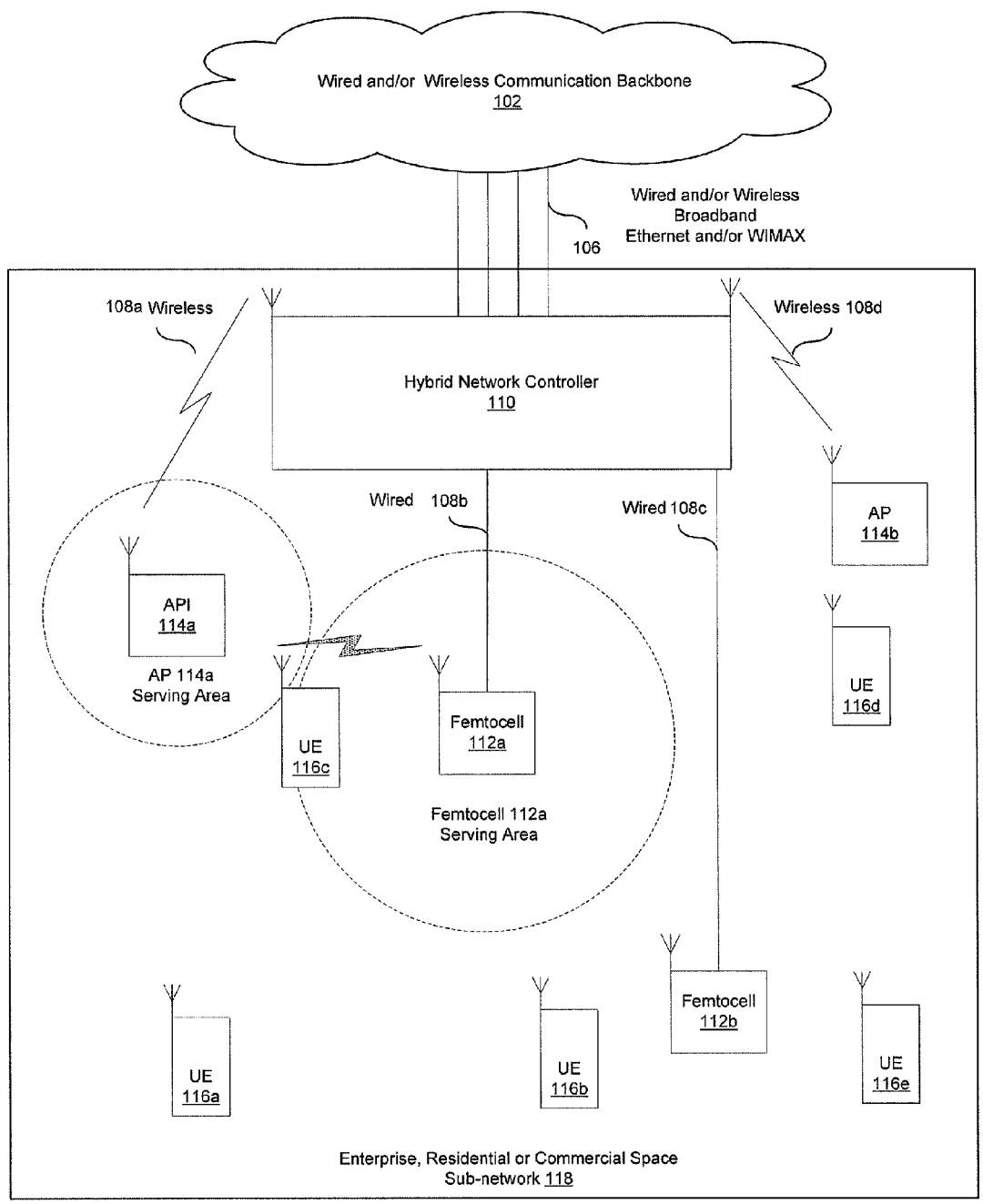
FIG. 1B is a block diagram illustrating exemplary endpoint devices that may be operable to receive traffic management information from the hybrid network controller to handle handoff management among one or more femtocells, access points and endpoint devices, in accordance with an embodiment of the invention.

FIG. 1B is a block diagram illustrating exemplary endpoint devices that may be operable to receive traffic management information from the hybrid network controller to handle handoff management among one or more femtocells, access points and endpoint devices, in accordance with an embodiment of the invention. Referring to FIG. 1B, there is shown the wired and/or wireless communication backbone 102, the Ethernet, WiMax and/or LTE broadband link 106, the wired and/or wireless connections 108, the hybrid network controller 110, the femtocells 112a and 112b, the access points (APs) 114a and 114b, the user equipment (UE) 116a, . . . , 116e, and the hybrid sub-network 118.

The wired and/or wireless communication backbone 102, the Ethernet, WiMax and/or LTE broadband link 106, the wired and/or wireless connection 108, the hybrid network controller 110, the femtocells 112a and 112b, the access points (APs) 114a and 114b, the user equipment (UE) 116a, . . . , 116e and the hybrid sub-network 118 are described with respect to FIG. 1A.

The Ethernet, WiMax and/or LTE broadband link 106 comprises suitable logic circuitry and/or code that is operable to carry traffic for the femtocells 112 and the APs 114 to and/or from the wired and/or wireless communication backbone 102. For example, the Ethernet, WiMax and/or LTE broadband link 106 may transport IP packets to one or more of the networks 104 described with respect to FIG. 1A. In addition, the Ethernet, WiMax and/or LTE broadband link 106 may provide access to the Internet and/or one or more private networks. The Ethernet, WiMax and/or LTE broadband link 106 comprise one or more of optical, wired, and/or wireless links. In various embodiments of the invention, the Ethernet, WiMax and/or LTE broadband link 106 may comprise a WIMAX and/or LTE base station 122 and the hybrid network controller 110 may communicate with the networks 104 via the WIMAX and/or LTE base station 122 and the broadband mobile network 104d. In various embodiments of the invention, the Ethernet, WiMax and/or LTE broadband link 106 may comprise a broadband connection such as a digital subscriber line (DSL), Ethernet, passive optical network (PON), a T1/E1 line, a cable television infrastructure, a satellite television infrastructure, and/or a satellite broadband Internet connection.

In operation, a UE 116 may have established a call and/or communication session with another UE device and/or with a network resource within the wired and/or wireless communication backbone 102. For example, the UE 116c may be engaged in an IP telephony call with the laptop 124b via the femtocell 112a, for example. The UE 116c may be moved away from the serving area of the femtocell 112a. The hybrid network controller 110 may utilize status and/or operating condition information received from one or more of the femtocells 112, the APs 114 and/or the UEs 116 to determine which femtocell and/or AP may qualify to receive a handoff of the UE 116a to serve the existing call and/or session. The determination may be based on one or more of signal quality measurements and/or availability of radio resources, for example. The UE 116 may receive traffic management information from the hybrid network controller 110. The UE 116 may be operable to select one or more of the femtocells 112 and/or the APs 114 to handle the handoff and may allocate resources and/or communicate control parameters to the selected femtocell and/or AP. For example, the UE 116c may select the AP 114a and may communicate control information to the femtocell 112a and/or the AP 114a to perform the handoff. In this manner, the UE 116 may manage the call and/or communication session between the one or more femtocells 112 and/or the one or more APs 114 and the UE 116. The UE 116 may also exchange information with a service provider, for example, via the RNC 124d, and may manage the handoff based on control information received from the service provider as well.

The hybrid network controller 110 may be operable to manage interference and/or balance UE 116 traffic for the sub-network 118. The hybrid network controller 110 may be operable to respond to dynamic conditions in a radio environment and/or respond to UE 116 traffic patterns. Accordingly, improvements in capacity and/or performance may be realized for the sub-network 118. The hybrid network controller 110 may be operable to exchange control information with the various femtocells 112, the APs 114 and/or the UEs 116 via the wired and/or wireless connections 108.

Figure 1C:
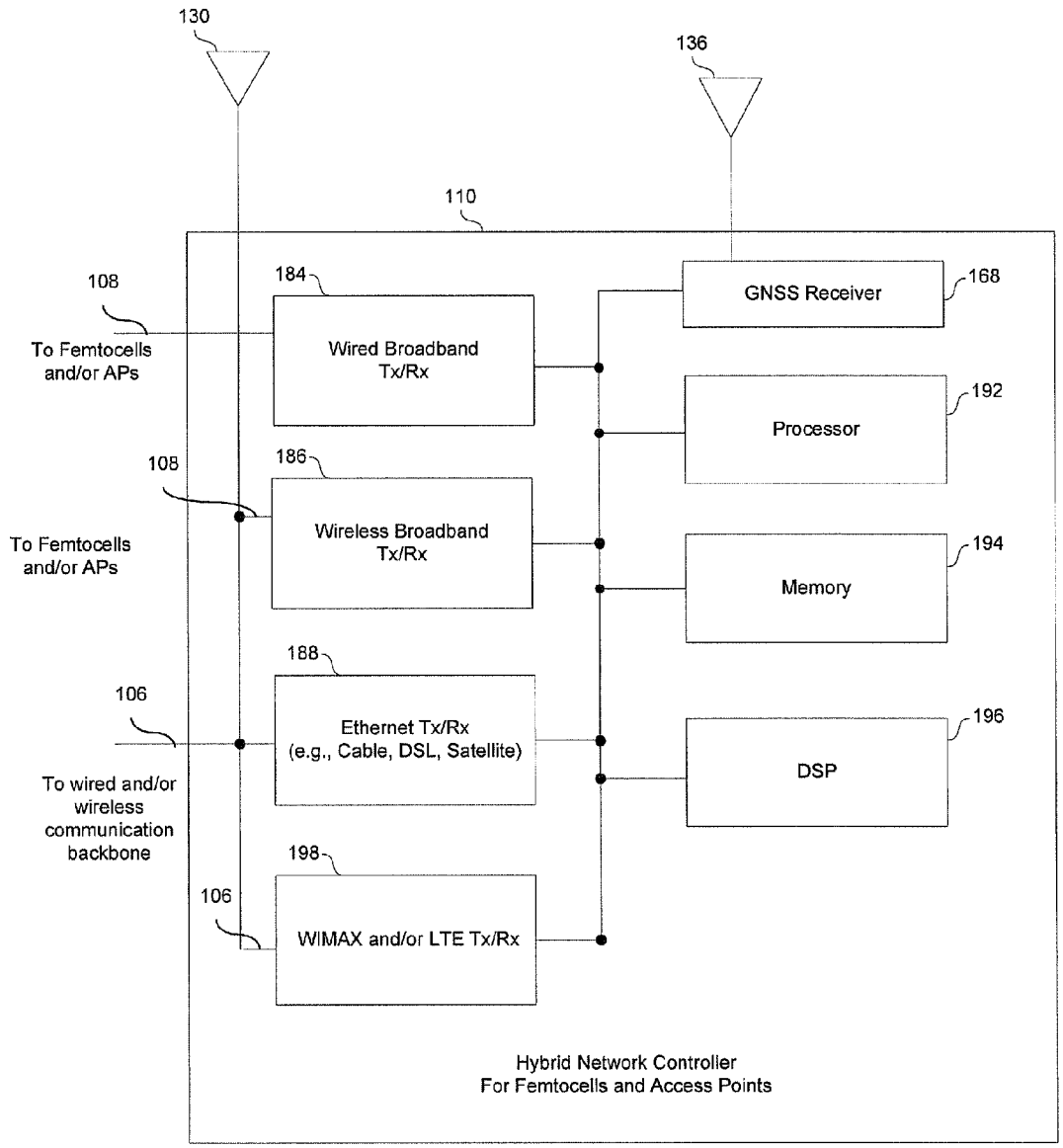
FIG. 1C is a block diagram of an exemplary hybrid network controller, in accordance with an embodiment of the invention.

FIG. 1C is a block diagram of an exemplary hybrid network controller, in accordance with an embodiment of the invention. Referring to FIG. 1C, there is shown, the hybrid network controller 110 that may comprise a wired broadband Tx/Rx 184, a wireless broadband Tx/Rx 186, an Ethernet Tx/Rx 188, a WIMAX and/or LTE Tx/Rx 198, a GNSS receiver 168, a GNSS antenna 136, a processor 192, a memory 194 and a DSP 196.

The Ethernet Tx/Rx 188 may comprise suitable logic, circuitry, interfaces and/or code that may be operable to transmit and/or receive data to and/or from the wired and/or wireless communication backbone via the Ethernet, WiMax and/or LTE broadband link 106. For example, the Ethernet Tx/Rx 188 may transmit and/or receive data via a T1/E1 line, PON, DSL, cable television infrastructure, satellite broadband internet connection and/or satellite television infrastructure for example. In various embodiments of the invention, the Ethernet Tx/Rx 188 may be operable to perform exemplary operations and/or functions comprising amplification, down-conversion, filtering, demodulation, and analog to digital conversion of received signals. In addition, the Ethernet Tx/Rx 188 may be operable to perform exemplary operations and/or functions comprising amplification, up-conversion, filtering, modulation, and digital to analog conversion of transmitted signals.

The WiMax and/or LTE Tx/Rx 198 may comprise suitable logic, circuitry, interfaces and/or code that may be operable to transmit and/or receive data via the antenna 130 to and/or from the WiMax and/or LTE base station 122 and/or the broadband mobile network 104d in the wired and/or wireless communication backbone 102. In this regard, the WiMax and/or LTE base station 122 may be utilized for the Ethernet, WiMax and/or LTE broadband link 106. The WiMax and/or LTE Tx/Rx 198 may be operable to perform exemplary operations and/or functions comprising amplification, down-conversion, filtering, demodulation, and analog to digital conversion of received signals. In addition, the WiMax and/or LTE Tx/Rx 198 may be operable to perform amplification, up-conversion, filtering, modulation, and digital to analog conversion of transmitted signals. The WiMax and/or LTE Tx/Rx 198 may be operable to communicate with the WiMax and/or LTE AP 114c.

The wired broadband Tx/Rx 184 and/or the wireless broadband Tx/Rx 186 may comprise suitable logic, circuitry, interfaces and/or code that may be operable to transmit and/or receive data in adherence with one or more broadband communication standards to the femtocells 112 and/or APs 114 via the wired and/or wireless connections 108. For example, the hybrid network controller 110 may communicate with the femtocells 112 and/or APs 114 via the wired broadband Tx/Rx 184 and an Ethernet cable in adherence to 802.3 communication standards. Alternatively, the Tx/Rx 186 may communicate via the antenna 130 for example in adherence to 802.11 communication standards. The wired broadband Tx/Rx 184 and/or wireless broadband Tx/Rx 186 may be operable to perform amplification, down-conversion, filtering, demodulation, and analog to digital conversion of received signals. In addition, the broadband Tx/Rx 184 and/or 186 may be operable to perform amplification, up-conversion, filtering, modulation, and digital to analog conversion of transmitted signals.

The antenna 130 may be suitable for transmitting and/or receiving signals to and/or from the wired and/or wireless communication backbone 102 and/or to and/or from the femtocells 112 and/or APs 114. Although a single antenna 130 is illustrated, the invention is not so limited. In this regard, the Tx/Rx 184, Tx/Rx 186, Tx/Rx 188 and/or Tx/Rx 198 may utilize a common antenna for transmission and reception, may utilize different antennas for transmission and reception, and/or may utilize a plurality of antennas for transmission and/or reception. The GNSS receiver 168 and GNSS antenna 136 may be similar and/or the same as the GNSS receive 168 and GNSS antenna 136 described with respect to FIG. 1D.

The processor 192 may comprise suitable logic, circuitry, interfaces and/or code that may enable processing data and/or controlling operations of the hybrid network controller 110. In this regard, the processor 192 may be enabled to provide control signals to the various other blocks within the hybrid network controller 110. The processor 192 may also control data transfers between various portions of the hybrid network controller 110. Additionally, the processor 192 may enable execution of applications programs and/or code. In various embodiments of the invention, the applications, programs, and/or code may enable, for example, parsing, transcoding and/or otherwise processing data.

In various embodiments of the invention, the applications, programs, and/or code may enable, for example, configuring and/or controlling operation of the wired and/or wireless broadband Tx/Rx 184 and/or 186, the Ethernet Tx/Rx 188, the WIMAX and/or LTE Tx/Rx 198, the GNSS receiver 168, the DSP 196, and/or the memory 194. For example, transmission power levels may be configured and/or handoffs may be scheduled.

The processor 192 may be operable to manage communication of data and/or QoS for data communicated via the Ethernet, WiMax and/or LTE broadband link 106, the Ethernet Tx/Rx 188 and/or the WIMAX and/or LTE Tx/Rx 198. In various embodiments of the invention, the processor 192 may send control information to the femtocells 112, the APs 114 and/or the UEs 116. In this regard, the processor 192 may be enabled to control communication between the femtocells 112 the APs 114 and the UEs 116. For example, the processor 192 may determine and communicate control parameters such as antenna weighting patterns, filter coefficients, power level, modulation scheme, error coding scheme, and/or data rates.

The processor 192 may comprise suitable logic, circuitry and/or code that are operable to communicate traffic management information to the UEs 116 to manage handoffs between and/or among one or more of the femtocells 112 and/or APs 114. In this regard, the processor 192 may be operable to receive status and/or operating condition information from the femtocells 112, APs 114 and/or the UEs 116 and may determine handoff candidates based on the received information. The hybrid network controller 110 may be operable to communicate configuration parameters and/or instruction to the femtocells 112, APs 114 and/or UEs 116 to enable the handoffs. In various embodiments of the invention, the processor 192 may be operable to exchange control information with a service provider in order to coordinate handoffs within the sub-network 118 and/or between the femtocells 112 and/or the APs within the sub-network 118 and entities external to the sub-network 118, for example, the cellular macrocell base station 120 described with respect to FIG. 1A.

The memory 194 may comprise suitable logic, circuitry, interfaces and/or code that may enable storage or programming of information that includes, for example, parameters and/or code that may effectuate the operation of the hybrid network controller 110. Exemplary parameters may comprise configuration data and exemplary code may comprise operational code such as software and/or firmware, but the information need not be limited in this regard. Moreover, the parameters may comprise adaptive filter and/or block coefficients. Additionally, the memory 194 may buffer or otherwise store received data and/or data to be transmitted. In various embodiments of the invention, the memory 192 may comprise neighbor list information and/or information comprising status and/or operating conditions for the femtocells 112, APs 114 and/or the UEs 116. For example, the memory 192 may comprise one or more look-up tables (LUTs) which may be utilized for determining handoff candidates from one or more of the femtocells 112 and/or the APs 114.

The DSP 196 may comprise suitable logic, circuitry, interfaces and/or code that may be operable to perform computationally intensive processing of data. The DSP 196 may be operable to handle exemplary operations comprising encoding, decoding, modulating, demodulating, encryption, decryption, scrambling, descrambling, and/or otherwise processing of data. The DSP 196 may be enabled to adjust a modulation scheme, error coding scheme, and/or data rates of transmitted signals. One or more of the DSP 196, the processor 192 and/or the memory 194 within the hybrid network controller 110 may be operable to implement a femtocell stack that supports communication with the femtocells 112 and other femtocell communication functions In operation, the hybrid network controller 110 may communicate with one or more of the femtocells 112, APs 114 and/or UEs 116 via the wired Tx/Rx 184 and/or the wireless broadband Tx/Rx 186 and wired and/or via the wireless links 108. In this regard, the hybrid network controller 110 may receive information from the femtocells 112, the APs 114 and/or the UEs 116 regarding various operating conditions. Exemplary operating conditions may comprise device capabilities, round trip path delay, received signal strength, measured interference, configuration parameters, antenna beam forming patterns, bit error rates, available bandwidth, timing and/or location information. In various embodiments of the invention, global navigation satellite system (GNSS) timing and/or location coordinates may be provided. In addition, device capabilities such as antenna types, available communication standards, hardware configuration, software configuration, maximum transmit power, and/or battery strength for example. Information received from the femtocells 112, the APs 114 and/or the UEs 116 may be utilized by the processor 192 to determine which one or more of the APs and/or femtocells may be handoff candidates. The hybrid network controller 110 may be operable to communicate control and/or configuration parameters that may enable a handoff to the selected one or more handoff candidates and/or the UE 116. For example, transmit power, frequency, time slot, PN code offset and/or location information may be communicated. The hybrid network controller 110 may send and/or receive information to and/or from a service provider so that the service provider may also manage various aspects of the handoff.

In an exemplary usage scenario, the hybrid network controller 110 may set up a new call and/or communication session. The femtocell 112 may provide information to the hybrid network controller 110 that may indicate that a call and/or communication set-up may be needed for a UE 116. Moreover, the hybrid network controller 110 may communicate traffic management information, for example, one or more timing and/or RF measurements, load balancing information, traffic usage information, current configuration and/or received signal strength to the UE 116. The UE 116 may instruct the femtocell 112 and/or the AP 114 to set up a call and/or communication session based on the received traffic management information. The UE 116 may manage the call and/or communication session. The femtocell 112 and/or the AP 114 may request a handoff and/or may provide traffic management information to the hybrid network controller 110 that may indicate that a handoff may be needed. For example, the hybrid network controller 110 may receive one or more measurements comprising bit error rate and/or received signal strength from the serving femtocell 112 and/or AP 114. The received measurements may exceed a threshold that may be stored in the memory 194 and may trigger a handoff. The hybrid network controller 110 may analyze resource availability, current status and/or operating condition information from a plurality of femtocells 112 and/or APs 114 and may determine which one or more of the femtocells 112 and/or the APs 114 may be appropriate to receive the handoff. The hybrid network controller 110 may assign resources and/or communicate configuration parameters for the handoff to the selected one or more of the femtocells 112 and/or the APs 114 and may instruct the UE 116, femtocells 112 and/or the APs to execute the handoff.

Figure 1D:
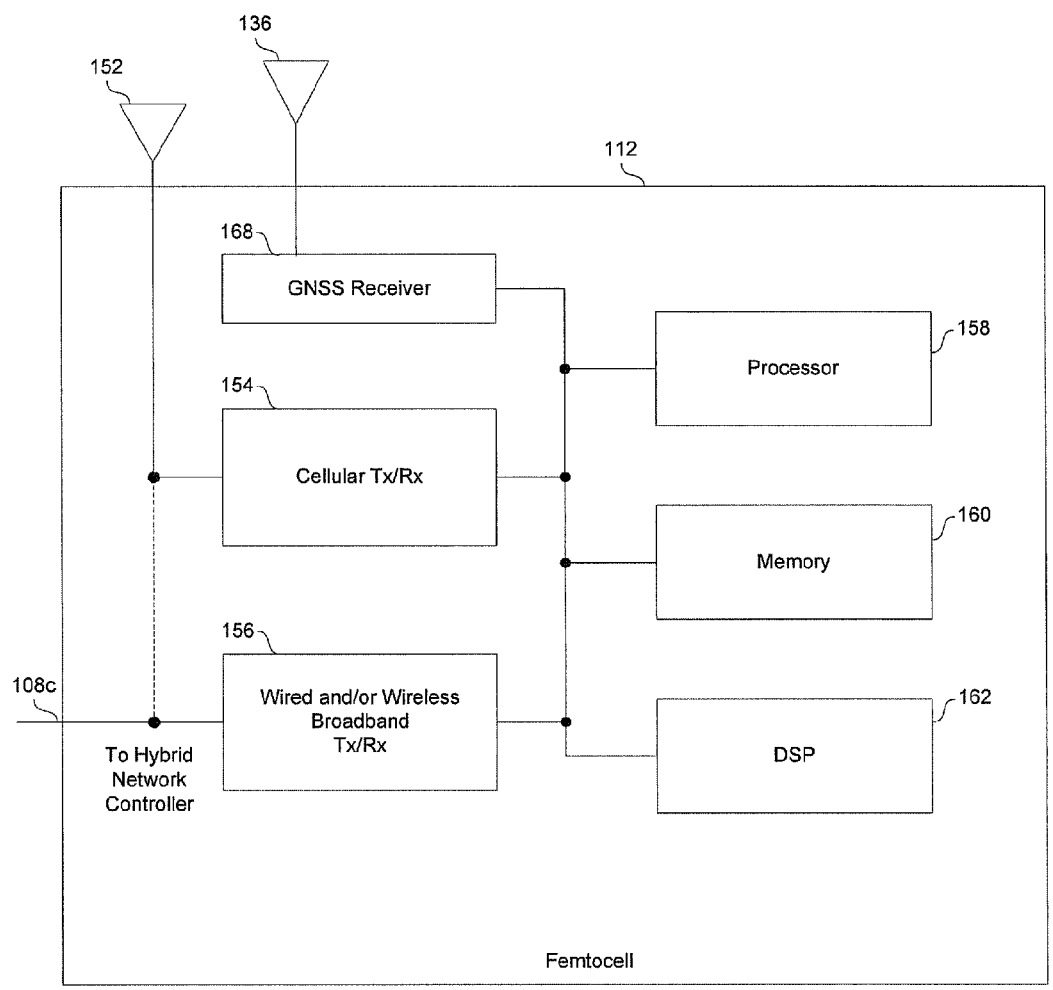
FIG. 1D is a block diagram of an exemplary femtocell, in accordance with an embodiment of the invention.

FIG. 1D is a block diagram of an exemplary femtocell, in accordance with an embodiment of the invention. Referring to FIG. 1D, there is shown a femtocell 112 comprising an antenna 152, a cellular transmitter and/or receiver (Tx/Rx) 154, a wired and/or a wireless broadband transmitter and/or receiver (Tx/Rx) 156, a processor 158, a memory 160, a digital signal processor (DSP) 162, a global navigation satellite system (GNSS) receiver 168 and a GNSS antenna 136. The femtocell 112 may be similar to or the same as the femtocells 112 described with respect to FIG. 1A and/or FIG. 1B.

The GNSS receiver 168 and GNSS antenna 136 comprise suitable logic, circuitry and/or code to receive signals from one or more GNSS satellites, for example, GPS satellites. The received signals may comprise timing, ephemeris, long term orbit information, and/or almanac information that enable the GNSS receiver 168 to determine its location and/or time.

The antenna 152 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception. In various embodiments of the invention, the antenna 152 may comprise suitable logic circuitry and/or code to perform beamforming. For example, the antenna 152 may be a smart antenna and/or may comprise a multiple input, multiple output (MIMO) antenna system.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform exemplary operations and/or functions comprising amplification, up-conversion, filtering, modulation and/or digital to analog conversion of transmitted cellular signals. The cellular Tx/Rx 154 may be operable to support communication over a plurality of communication channels utilizing time division multiple access (TDMA) and/or code division multiple access (CDMA) for example. In addition, exemplary cellular standards supported by the femtocells 112 may be specified in the International Mobile Telecommunications-2000 (IMT-2000) standard and/or developed by the $3^{rd}$ generation partnership project (3GPP) and/or the $3^{rd}$ generation partnership project 2 (3GPP2). In addition, $4^{th}$ generation standards, for example, LTE may be supported by the cellular Tx/Rx 154. In various embodiments of the invention, the cellular Tx/Rx 154 may be enabled to measure received signal strength and may adjust a power level and/or a modulation scheme or level of transmitted signals.

The wired and/or wireless broadband Tx/Rx 156 may comprise suitable logic, circuitry, interfaces and/or code that may be operable to transmit voice and/or data in adherence to one or more broadband communication standards. The broadband Tx/Rx 156 may be operable to perform exemplary functions or operations comprising amplification, down-conversion, filtering, demodulation and/or analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data to and/or from the hybrid network controller 110 over the wired connection 108*a* and/or over the wireless connection 108*c* via the antenna 152.

The processor 158 may comprise suitable logic, circuitry, interfaces and/or code that may enable processing data and/or controlling operations of the femtocell 112. In this regard, the processor 158 may be enabled to provide control signals to the various other blocks within the femtocell 112, for example the DSP 162, memory 160 and/or Tx/Rx 154. The processor 158 may also control data transfers between various portions of the femtocell 112. Additionally, the processor 158 may enable execution of applications programs and/or code. In various embodiments of the invention, the applications, programs, and/or code may enable, for example, parsing, transcoding and/or otherwise processing data.

In various embodiments of the invention, the applications, programs, and/or code may enable, for example, configuring or controlling operation of the antenna 152, cellular transmitter and/or receiver 154, the broadband transmitter and/or receiver 156, the GNSS receiver 168, the DSP 162, and/or the memory 160. The processor 158 may receive control information from the hybrid network controller 110. In this regard, the processor 158 may be enabled to provide one or more signals to the cellular Tx/Rx 154, the memory 160, and/or the DSP 162 to control communication between the femtocell 112 and the UE 116. In addition, the processor 158 may control exemplary parameters comprising neighbor list information, signal quality thresholds, frequency, transmission time, PN code, antenna radiation pattern power level, modulation scheme, error coding scheme, and/or data rates of transmitted cellular signals.

The memory 160 may comprise suitable logic, circuitry, interfaces and/or code that may enable storage or programming of information that comprise parameters and/or code that may effectuate the operation of the femtocell 112. Furthermore, the parameters may enable handoffs of calls and/or data sessions between and/or among other femtocells 112 and/or the APs 114. A portion of the programming information and/or parameters may be received from the hybrid network controller 110. The parameters may comprise configuration data and the code may comprise operational code such as software and/or firmware, but the information need not be limited in this regard. Moreover, the parameters may comprise neighbor list information, signal quality thresholds, adaptive filter and/or block coefficients, frequencies, transmission time, PN codes and/or antenna radiation patterns for example. The memory 160 may be operable to buffer or otherwise store received data and/or data to be transmitted. In various embodiments of the invention, the memory 160 may comprise one or more look-up tables which may be utilized for determining cellular devices that may be within a coverage area of the femtocell 112.

The DSP 162 may comprise suitable logic, circuitry, interfaces and/or code operable to perform computationally intensive processing of data. The DSP 162 may be operable to encode, decode, modulate, demodulate, encrypt, decrypt, scramble, descramble, and/or otherwise process data. For example, in instances when the femtocell 112 may communicate with a femtocell, the DSP 162, the processor 158 and/or the memory 160 may perform physical layer functions such as encoding and/or decoding, as well as OSI layer two and/or layer three functionality. Alternatively, the femtocell 112 may communicate with an access point based on IP protocol. The DSP 162 may also be enabled to adjust a modulation scheme, error coding scheme, and/or data rates of transmitted cellular signals data. Moreover, one or more of the processor 158, the memory 160 and the DSP 162 may be operable to implement a femtocell stack that supports communication with the femtocells 112 and/or other femtocell communication functions.

In operation, the femtocell 112 may determine signal characteristics such as direction of arrival, interference levels and signal strength of signals received via a cellular communication channel. Similarly, the DSP 162 and/or the processor 156 may determine bit error rates of data received via a cellular communication channel and available bandwidth of the channel. The measurements may be communicated to the hybrid network controller 110 by the Broadband Tx/Rx 156 via the wired connection 108a and/or the wireless connection 108c or to the UE 116 via the wireless connection 108c. Additionally, the femtocell 112 may receive feedback from a UE 116 on the other end of a cellular communication channel that may also be communicated to the hybrid network controller 110 via the broadband Tx/Rx 156.

Handoff management messages may be received via the broadband Tx/Rx 156 from the hybrid network controller 110. The processor 158 may utilize the received management messages to configure, for example, the cellular Tx/Rx 154, the antenna 152 and/or the DSP 162 for handing off a call and/or communication session with a UE 116. In this regard, handoff parameters comprising neighbor list information, signal quality thresholds, frequency, time slot, PN codes and/or radiation pattern for a communication channel between the femtocell 112 and the UE 116 may be configured. Additionally, handoff management messages from the hybrid network controller 110 may be conveyed via the femtocell 112 to the UEs 116.

Figure 1E:
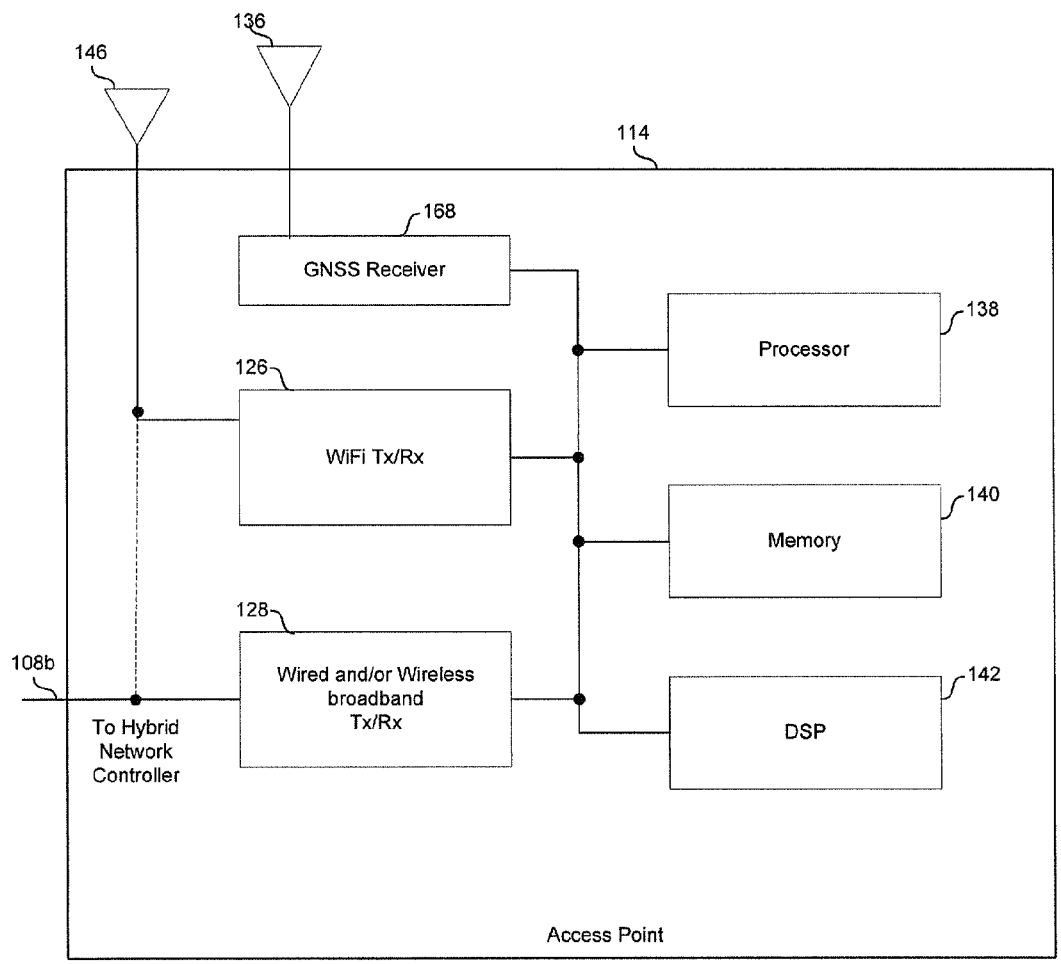
FIG. 1E is a block diagram of an exemplary access point, in accordance with an embodiment of the invention.

FIG. 1E is a block diagram of an exemplary access point, in accordance with an embodiment of the invention. Referring to FIG. 1E, there is shown an AP 114 comprising an antenna 146, a WiFi transmitter and/or receiver (Tx/Rx) 126, a wired and/or a wireless broadband transmitter and/or receiver (Tx/Rx) 128, a processor 138, a memory 140, a digital signal processor (DSP) 142, a global navigation satellite system (GNSS) receiver 168 and a GNSS antenna 136. The AP 114 may be similar to or the same as the APs 114 described with respect to FIG. 1A and/or FIG. 1B.

The GNSS receiver 168 and GNSS antenna 136 may be similar and/or the same as the GNSS receive 168 and GNSS antenna 136 described with respect to FIG. 1D.

The antenna 146 may be suitable for transmitting and/or receiving signals to and/or from the UE 116 and/or to and/or from the hybrid network controller 110. Although a single antenna is illustrated, the invention is not so limited. In this regard, the WiFi Tx/Rx 126 and/or wired and/or wireless broadband Tx/Rx 128 may utilize a common antenna for transmission and reception, may utilize different antennas for transmission and reception, and/or may utilize a plurality of antennas for transmission and/or reception. The antenna 146 may comprise suitable logic circuitry and/or code to perform beamforming. For example, the antenna 146 may be a smart antenna and/or may comprise a MIMO system.

The wired and/or wireless broadband Tx/Rx 128 may comprise suitable logic, circuitry, interfaces and/or code that may be operable to transmit data in adherence to one or more broadband standards to the hybrid network controller 110 for one or more UE 116. In this regard, the wired and/or wireless broadband Tx/Rx 128 may communicate data to and/or from a plurality of UE 116 to and/or from the hybrid network controller 110. The wired and/or wireless broadband Tx/Rx 128 may be operable to perform exemplary operations and/or functions comprising amplification, down-conversion, filtering, demodulation, and analog to digital conversion of received signals. The wired and/or wireless broadband Tx/Rx 128 may be operable to perform amplification, up-conversion, filtering, modulation, and digital to analog conversion of transmitted signals. In various exemplary embodiments of the invention, the wired and/or wireless broadband Tx/Rx 128 may transmit and/or receive data over the wired connection 108b and/or over the wireless connection 108d via the antenna 146. In various embodiments of the invention, an AP 114 may utilize the same Tx/Rx 128 for communicating with the UE 112 and with the hybrid network controller 110.

The processor 138 may comprise suitable logic, circuitry, interfaces and/or code that may enable processing data and/or controlling operations of the AP 114. In this regard, the processor 138 may be enabled to provide control signals to the various other blocks comprising the AP 114. The processor 138 may also control data transfers between various portions of the AP 114. Additionally, the processor 138 may enable execution of applications programs and/or code. The applications, programs, and/or code may enable, for example, parsing, transcoding, or otherwise processing data. In addition, the applications, programs, and/or code may enable, for example, configuring or controlling operation of the WiFi Tx/Rx 126, the antenna 146, the broadband Tx/Rx 128, the GNSS receiver 168, the DSP 142, and/or the memory 140. The processor 138 may receive control information from the hybrid network controller 110. In this regard, the processor 138 may be enabled to provide one or more control signals to the WiFi Tx/Rx 126, the antenna 146, the wired and/or wireless broadband Tx/Rx 128, the memory 140, and/or the DSP 142 to control communication between the AP 114 and the UE 116. In addition, the processor 138 may control handoff parameters such as neighbor list information, signal quality thresholds, frequency, transmission time, PN code, antenna radiation pattern, transmission power level, modulation scheme, error coding scheme, and/or data rates of transmitted WiFi signals.

The memory 140 may comprise suitable logic, circuitry, interfaces and/or code that may enable storage or programming of information that includes parameters and/or code that may effectuate the operation of the AP 114. Furthermore, the parameters may enable handoffs of calls and/or data sessions between and/or among other APs 114 and/or the femtocells 112. A portion of the programming information and/or parameters may be received from the hybrid network controller 110. Parameters may comprise configuration data and the code may comprise operational code such as software and/or firmware, but the information need not be limited in this regard. Moreover, the handoff parameters may include neighbor list information, signal quality thresholds, adaptive filter and/or block coefficients. Additionally, the memory 140 may buffer or otherwise store received data and/or data to be transmitted. In various embodiments of the invention, the memory 140 may comprise one or more look-up tables which may be utilized for determining WiFi access within a coverage area of the AP 114.

The DSP 142 may comprise suitable logic, circuitry, interfaces and/or code operable to perform computationally intensive processing of data. In various embodiments of the invention, the DSP 142 may encode, decode, modulate, demodulate, encrypt, decrypt, scramble, descramble, and/or otherwise process data. The DSP 142 may be enabled to adjust a modulation scheme, error coding scheme, and/or data rates of transmitted WiFi signal data.

In operation, the AP 114 may be engaged in a call with a UE 116. The WiFi Tx/Rx 126 may determine signal characteristics such as interference levels and signal strength of desired signals received via a WiFi communication channel. Similarly, the DSP 142 and/or the processor 138 may determine bit error rates of data received via a WiFi communication channel and available bandwidth of the channel. The measurements may be communicated to the hybrid network controller 110 by the broadband Tx/Rx 128 via the wired connection 108*b* and/or the wireless connection 108*d*. Additionally, the AP 114 may receive feedback from a UE 116 via the WiFi link 120*a* that may also be communicated to the hybrid network controller 110 by the wired and/or wireless broadband Tx/Rx 128.

The hybrid network controller, the AP 114 and/or the UE 116 that may be engaged in the call may determine that the UE 116 may need to handoff to another AP 114 or femtocell 112. The broadband Tx/Rx 128 may receive handoff management messages from the hybrid network controller 110 and/or the UE 116. The processor 138 may utilize the received handoff management messages to configure the WiFi Tx/Rx 126, the antenna 146 and/or the DSP 142 for the handoff. Additionally, handoff management messages from the hybrid network controller 110 may be communicated to the UE 116 via the WiFi Tx/Rx 126.

Figure 1F:
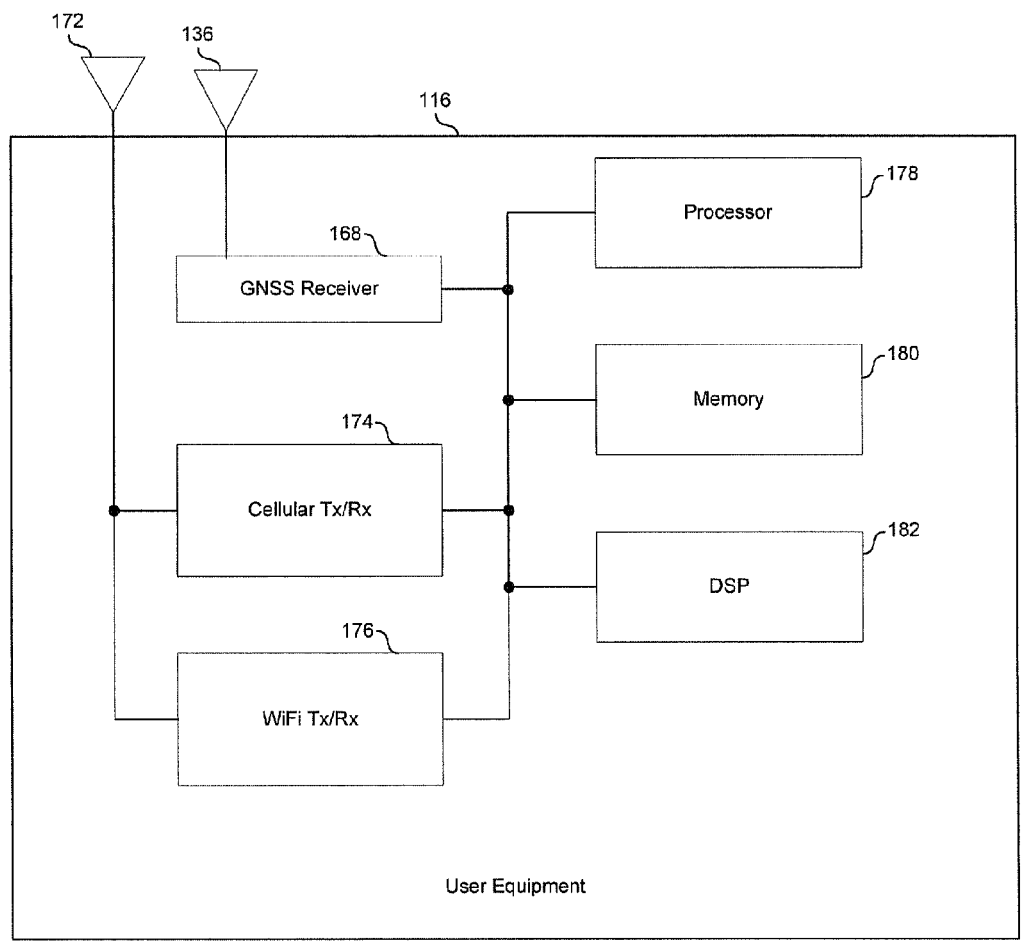
FIG. 1F is a block diagram of exemplary user equipment, in accordance with an embodiment of the invention.

FIG. 1F is a block diagram of exemplary user equipment, in accordance with an embodiment of the invention. The UE 116 may comprise a cellular Tx/Rx 174, a WiFi Tx/Rx 176, an antenna 172, a global navigation satellite system (GNSS) receiver 168, a GNSS antenna 136, a processor 178, a memory 180, and a DSP 182. The UE 116 may be similar or the same as one or more of the UE 116*a*, . . . , 116*g* described with respect to FIGS. 1A and/or 1B. The GNSS receiver 168 and GNSS antenna 136 may be similar or the same as the GNSS receiver 168 and GNSS antenna 136 described with respect to FIG. 1D.

The antenna 172 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception. In various embodiments of the invention, the antenna 172 may be operable to perform beamforming and/or may comprise a MIMO or virtual MIMO antenna system for example.

The UE 116 may be a multimode wireless device and may comprise a plurality of wireless transmitters and/or receivers (Tx/Rx). The cellular Tx/Rx 174 may be similar to or the same as the cellular Tx/Rx 154 described with respect to FIG. 1D. The cellular Tx/Rx 174 may enable communication between a UE 116 and one or more femtocells 112. The cellular Tx/Rx 174 may be operable to communicate based on a wireless voice and/or data communication standard, for example, 3GPP, 3GPP2, LTE and/or WIMAX. Although the UE 116 shown in FIG. 1F comprises two Tx/Rx units, for cellular and WiFi, the UE 116 is not limited in this regard. For example, the UE 116 may be a multi-mode device that may comprise a plurality of Tx/Rx units and may be operable to communicate based on a plurality of wireless voice and/or data communication standards for example, 3GPP, 3GPP2, LTE, WIMAX, 802.11, Bluetooth and Zigbee.

The WiFi Tx/Rx 176 may be similar and/or the same as the WiFi Tx/Rx described with respect to FIG. 1E. The WiFi Tx/Rx 176 may enable communication between a UE 116 and one or more APs 114.

The processor 178 may comprise suitable logic, circuitry, interfaces and/or code that may enable processing data and/or controlling operations of the UE 116. In this regard, the processor 178 may be enabled to provide control signals to the various other blocks within the UE 116. The processor 178 may also control data transfers between various portions of the UE 116. Additionally, the processor 178 may enable execution of applications programs and/or code. The applications, programs, and/or code may enable processing data, call and/or session set-up and/or handoffs. In addition, the applications, programs, and/or code may enable, for example, configuring or controlling operation of the cellular Tx/Rx 174, the antenna 172, the GNSS receiver 168, the WiFi Tx/Rx 176, the DSP 182, and/or the memory 180.

In an exemplary embodiment of the invention, the processor 178 may control service measurements taken by the UE 116 comprising received signal strength, interference levels and/or signal to noise ratio (SNR), SINR, CINR, signal path delay, bandwidth usage and/or radio resource availability. The service measurements may be utilized by the UE 116, a femtocell 112, an AP 114 and/or the hybrid network controller 110 to make decisions regarding handoffs. The processor 178 may also receive traffic management information from the hybrid network controller 110. In this regard, the processor 178 may be enabled to provide one or more signals to the cellular Tx/Rx 174, the WiFi Tx/Rx 176, the memory 180, and/or the DSP 182 to control handoffs between and/or among the femtocells 112 or the APs 114. In addition, the processor 178 may control handoff configuration parameters that may comprise handoff neighbor list information, signal quality thresholds, frequency, transmission time, PN code, antenna radiation pattern, transmit power level, modulation scheme, error coding scheme, and/or data rates of transmitted cellular and/or WiFi signals. The processor 178 may be operable to analyze current status, operating conditions, available resources and/or control information from the hybrid network controller 110, the femtocells 112 and/or the APs 114 to make handoff decisions. In various embodiments of the invention, the processor 178 may be operable to limit handoffs to femtocells 112 and/or APs 114 within the sub-network 118 even in instances when good signals from nearby entities external to the sub-network 118, for example, the cellular macrocell base station 120 may be received by the UE 116.

The memory 180 may comprise suitable logic, circuitry, interfaces and/or code that may enable storage or programming of information that includes parameters and/or code that may effectuate the operation and/or handoffs of the UE 116. For example, the memory 180 may comprise neighbor list information and/or signal quality thresholds that may enable handoffs. A portion of the programming information and/or parameters may be received from the hybrid network controller 110. Parameters may comprise configuration data and the code may comprise operational code such as software and/or firmware, but the information need not be limited in this regard. Moreover, the parameters may comprise adaptive filter and/or block coefficients, frequency, transmission time, PN code. Additionally, the memory 180 may buffer or otherwise store received data and/or data to be transmitted. The memory 180 may comprise one or more look-up tables which may be utilized to determine which femtocells 112 and/or APs 114 are within a range of the UEs 116 and may be handoff candidates.

The DSP 182 may comprise suitable logic, circuitry, interfaces and/or code operable to perform computationally intensive processing of data. The DSP 182 may be operable to encode, decode, modulate, demodulate, encrypt, decrypt, scramble, descramble, and/or otherwise process data. The DSP 182 may be enabled to adjust a modulation scheme, error coding scheme, and/or data rates of transmitted cellular and/or WiFi signal data.

In operation, the UE 116 may be operable to transmit and/or receive signals to and/or from one or more of the femtocells 112 and/or the APs 114 that may utilize a one or more wireless communication standards. The cellular Tx/Rx 174 and/or WiFi Tx/Rx 176 may be operable to determine received signal characteristics comprising, for example, interference levels and/or signal strength. Similarly, the DSP 182 and/or the processor 156 may be operable to determine bit error rates of data received via one or more communication channels and/or may determine available bandwidth of the channel. Information, for example, measurements and/or status, from the Tx/Rx 174, the Tx/Rx 176, the GNSS receiver 168, the memory 160, the processor 178 and/or the DSP 182 may be communicated to the hybrid network controller 110, the femtocell 112 and/or the AP 114. The information may be utilized by the hybrid network controller 110, the femtocells 112, the APs 114 and/or the UE 116 for making decisions regarding handoffs. For example, decisions may comprise which type of handoff to perform, which femtocell and/or AP to handoff to, when to handoff, initial transmit power and/or which frequency, time slot and/or PN code to transmit and/or receive on.

Figure 2:
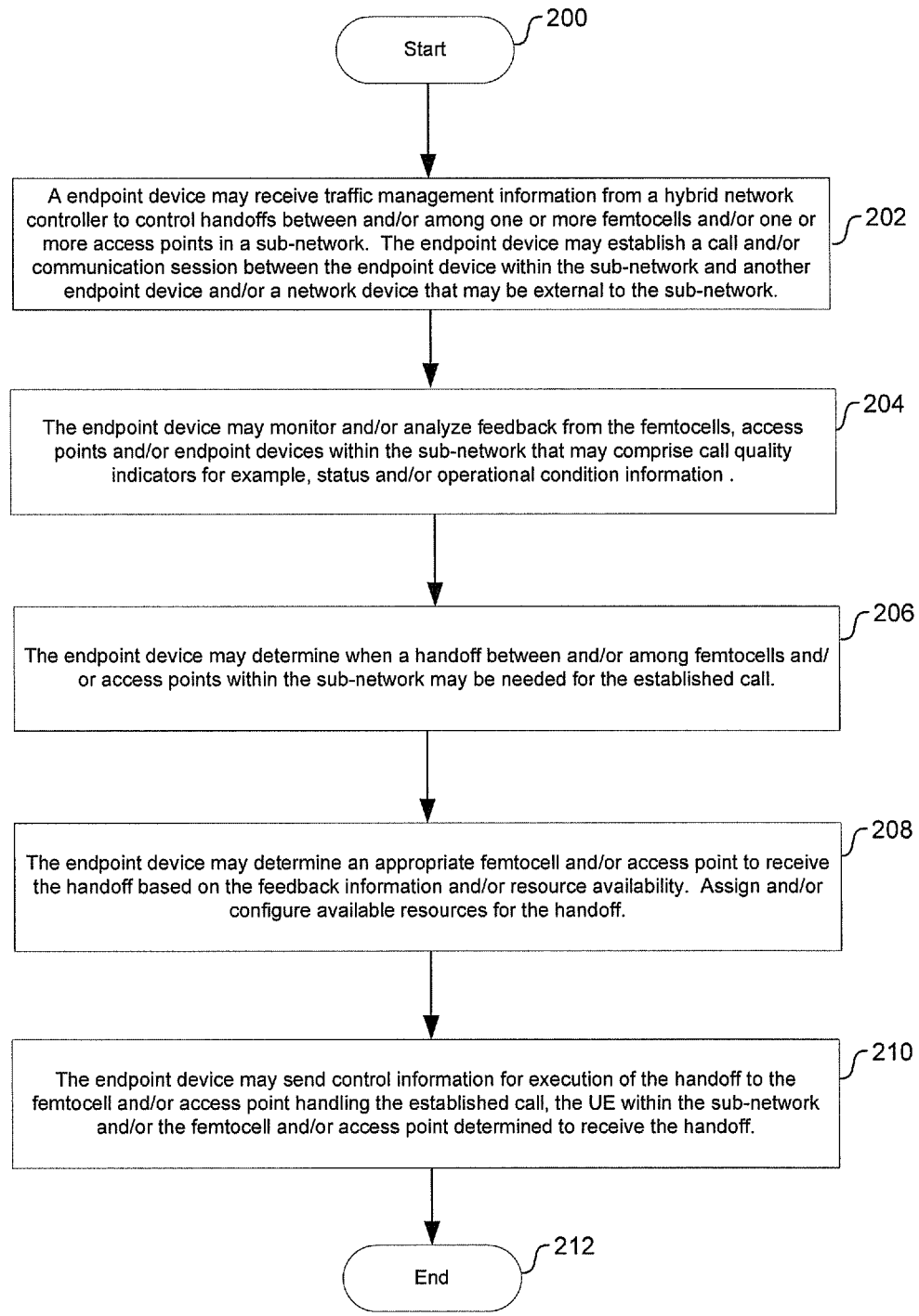
FIG. 2 is a flowchart illustrating exemplary steps for handoff control by a endpoint device in a hybrid sub-network comprising femtocells and/or access points, in accordance with an embodiment of the invention.

FIG. 2 is a flowchart illustrating exemplary steps for handoff control by a endpoint device in a hybrid sub-network comprising femtocells and/or access points, in accordance with an embodiment of the invention. Referring to FIG. 2, the exemplary steps may begin with start step 200. In step 202, a endpoint device 116 may receive traffic management information from a hybrid network controller 110 to enable setup and control handoffs between and/or among one or more femtocells 112 and/or one or more access points 114 in a sub-network 118. The endpoint device 116 may establish a call and/or communication session between the endpoint device 116 within the sub-network 118 and another endpoint device, a femtocell and/or an access point. The other endpoint device and/or network device may be external to the sub-network, for example, it may be a device within the wired and/or wireless communication backbone 102.

In step 204, feedback from the femtocells 112, the access points 114 and/or the endpoint devices 116 within the sub-network 118 that may comprise call quality indicators, for example, status and/or operational condition information may be monitored and/or analyzed by the endpoint device 116. In step 206, the endpoint device 116 may determine when a handoff between and/or among femtocells 112 and/or access points 114 may be needed for the established call. In step 208, the endpoint device 116 may determine an appropriate femtocell 112 and/or access point 114 to receive the handoff based on the feedback information and/or resource availability. Available resources may be assigned and/or configured for the handoff. In step 210, the endpoint device 116 may send control information for execution of the handoff to the femtocell 112 and/or access point 114 that are handling the established call, the UE 116 within the sub-network 118 and/or the femtocell 112 and/or access point 114 that may have been determined to receive the handoff. The exemplary steps may end with step 212.

In various embodiments of the invention, a communication system 118 may comprise a hybrid network controller 110, one or more femtocells 112, one or more access points 114 and/or one or more endpoint devices 116. The endpoint device 116 may receive traffic management information from the hybrid network controller 110 for enabling handoff of a communication session between and/or among one or more of the femtocells 112 and/or one or more of the access points 114. In addition, the endpoint device 116 may communicate the determined handoff information to femtocells 112, the access points 114 and/or the end-point devices 116 for the enabling of the handoff. The received traffic management information may comprise one or more of setup instructions, handoff instructions, transmit power, neighbor list information, traffic load balancing, signal quality thresholds, bandwidth requirements, frequency assignments, transmission time, code assignments and/or antenna pattern assignments, for example.

In various embodiments of the invention, the endpoint device 116 may control handoffs between and/or among a communication device external to the communication system 118, for example, the laptop 124b and one or more of the femtocells 112 and/or the access points 114. Status and/or operating conditions of one or more of the femtocells 112, the access points 114 and/or the end-point devices 116 may be monitored and/or analyzed by the endpoint device 116. In this regard, the status and/or operating conditions may comprise received signal strength, interference levels, signal to noise ratio, signal path delay, power consumption, bandwidth usage and/or radio resource availability, for example. One or more of the femtocells 112 and/or the access points 114 may be allocated and/or assigned to receive the enabled handoff by the endpoint device 116. In addition, one or more time slots, codes and/or antenna patterns for the enabled handoff may be assigned and/or allocated by the endpoint device 116 based on the received traffic management information. The endpoint device 116 may receive traffic management information wirelessly from the hybrid network controller 110 utilizing one or more wireless connections, for example, via the wireless connection 108.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for enterprise level management in a multi-femtocell network.

Accordingly, the present invention may be realized in hardware or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
receiving, by an endpoint device, traffic management information from a hybrid network controller, to enable a handoff of a communication session with a femtocell or an access point, wherein said traffic management information comprises transmit power of said endpoint device; and
enabling said handoff of said communication session by said endpoint device based on said received traffic management information.

2. The method according to claim 1, wherein said traffic management information further comprises at least one of set-up instructions, handoff instructions, a maximum value of said transmit power, traffic load balancing, bandwidth requirements, frequency assignments, transmission time, neighbor list information, signal quality thresholds, code assignments, or antenna pattern assignments.

3. The method according to claim 1, wherein the receiving said traffic management information from said hybrid network controller comprises utilizing a wireless connection.

4. The method according to claim 1, further comprising controlling, by said endpoint device, handoffs among a communication device external to said communication system and said femtocell, said access point, or said end-point device.

5. The method according to claim 1, further comprising monitoring or analyzing, by said endpoint device, status or operating conditions of said femtocell, said access point, or said end-point device.

6. The method according to claim 5, wherein said status or operating conditions comprises at least one of received signal strength, interference levels, signal to noise ratio, signal path delay, power consumption, bandwidth usage, or radio resource availability.

7. The method according to claim 1, further comprising allocating or assigning, by said endpoint device, said femtocell or said access point to handle said enabled handoff.

8. The method according to claim 1, further comprising allocating or assigning, by said endpoint device, a code for said enabled handoff based on said received traffic management information.

9. The method according to claim 1, further comprising allocating or assigning, by said endpoint device, an antenna pattern for said enabled handoff based on said received traffic management information.

10. A system for communication, comprising:
a femtocell;
an access point;
an endpoint device; and
a processor for use in said endpoint device, said processor being configured to:
receive traffic management information from a hybrid network controller to enable handoff of a communication session between said femtocell or said access point, wherein said traffic management information comprises transmit power of said endpoint device; and
enable said handoff of said communication session, by said endpoint device, based on said received traffic management information.

11. The system according to claim 10, wherein said traffic management information comprises at least one of set-up instructions, handoff instructions, a maximum value of said transmit power, traffic load balancing, bandwidth requirements, frequency assignments, transmission time, neighbor list information, signal quality thresholds, code assignments, or antenna pattern assignments.

12. The system according to claim 10, wherein said processor is further configured to receive said traffic management information from said hybrid network controller utilizing a wireless connection.

13. The system according to claim 10, wherein said processor is further configured to control handoffs between a communication device external to said communication system and said femtocell, said access point, or said end-point device.

14. The system according to claim 10, wherein said processor is configured to monitor or analyze status or operating conditions of said femtocell, said access point, or said end-point device.

15. The system according to claim 14, wherein said status or operating conditions comprises at least one of received signal strength, interference levels, signal to noise ratio, signal path delay, power consumption, bandwidth usage, or radio resource availability.

16. The system according to claim 10, wherein said processor is further configured to allocate or assign said femtocell, said access point, or said endpoint device to handle said enabled handoff.

17. The system according to claim 10, wherein said processor is further configured to allocate or assign a time slot for said enabled handoff based on said received traffic management information.

18. The system according to claim 10, wherein said processor is further configured to allocate or assign a code for said enabled handoff based on said received traffic management information.

19. The system according to claim 10, wherein said processor is further configured to allocate or assign an antenna pattern for said enabled handoff based on said received traffic management information.

20. A method for communication, comprising:
  receiving, by an endpoint device, traffic management information from a hybrid network controller to enable a handoff of a communication session between a femtocell or an access point, wherein said traffic management information comprises transmit power of said endpoint device;
  allocating or assigning, by said endpoint device, a time slot for said enabled handoff based on said traffic management information; and
  enabling said handoff of said communication session, by said endpoint device, based on said traffic management information.

* * * * *